United States Patent [19]

Hawkins et al.

[11] Patent Number: 4,736,071

[45] Date of Patent: Apr. 5, 1988

[54] ENCAPSULATION SYSTEM WITH PRESSURIZATION MEANS

[75] Inventors: James B. Hawkins, Loganville; Thomas V. Lathrop, Dunwoody; William S. Pesto, Alpharetta, all of Ga.

[73] Assignee: American Telephone and Telegraph Company, AT&T Bell Laboratories, Murray Hill, N.J.

[21] Appl. No.: 59,211

[22] Filed: Jun. 3, 1987

Related U.S. Application Data

[63] Continuation-in-part of Ser. No. 840,139, Mar. 17, 1986.

[51] Int. Cl.$^4$ .................................. H02G 15/113
[52] U.S. Cl. .................................. 174/92; 156/48; 156/49; 174/21 R; 174/88 R; 174/91
[58] Field of Search .................. 174/21 R, 84 R, 88 R, 174/91, 92, 93; 156/48, 49

[56] References Cited

U.S. PATENT DOCUMENTS

| | | | |
|---|---|---|---|
| 1,929,580 | 10/1933 | Gray | 174/21 R |
| 3,466,384 | 9/1969 | Martin | 174/92 |
| 3,678,175 | 7/1972 | Appiani et al. | 174/21 R X |
| 3,796,823 | 3/1974 | Wright et al. | 174/92 |
| 3,875,325 | 4/1975 | Anderson et al. | 174/92 |
| 3,876,487 | 4/1975 | Garrett et al. | 156/390 |
| 3,881,050 | 4/1975 | Jaggi | 174/21 R |
| 3,895,180 | 7/1975 | Plummer | 174/92 |
| 4,209,352 | 6/1980 | Diaz et al. | 174/92 X |
| 4,466,843 | 8/1984 | Shimirak | 156/48 |
| 4,511,415 | 4/1985 | Dienes | 174/92 X |

OTHER PUBLICATIONS

*Product Application Bulletin*, 2200 Series Closure System, Jun. 1985, pp. 1-15.

*Primary Examiner*—Morris H. Nimmo
*Attorney, Agent, or Firm*—Eugen E. Pacher

[57] ABSTRACT

The long term water intrusion resistance of cable splice systems that use a gelable encapsulant that is pressurized prior to geletion can be improved by providing pressurization means that maintain the pressure on the cured encapsulant above a given pressure $p_2 > p_o$, where $p_o$ is the ambient pressure. Absent such pressurization means, the pressure on the encapsulant typically decreases with time due to creep or relaxation of nominally rigid components, e.g., a polymeric closure around the encapsulated splice, or varies due to differential thermal contraction. The pressurization means comprises one or more energy storage elements, e.g., an elastic member such as a spring, or a volume of compressed gas. In a preferred embodiment, an elastomeric "bag" is formed around the completed cable splice, the two halves of a plastic closure placed around the bag, the two halves fastened together with a spring clamps, liquid encapsulant introduced into the bag, and the encapsulant pressurized to a pressure $p_1 > p_2$. The spring clamps typically are dimensioned such that a gap exists between the two halves of the plastic closure for any pressure $\geq p_2$, at any temperature within a specified temperature range, at least up to the design life of the splice system. The existence of the gap assures that the spring clamps maintain pressure on the encapsulant within the closure.

16 Claims, 4 Drawing Sheets

(ENERGY STORAGE MEANS [SPRING])

ENCAPSULATION SYSTEM WITH PRESSURIZATION MEANS

This application is a continuation-in-part of application Ser. No. 840,139, filed Mar. 17, 1986.

FIELD OF THE INVENTION

This invention pertains to means for protecting a quantity of matter, e.g., a cable splice, by encapsulation with a curable encapsulant.

BACKGROUND OF THE INVENTION

The need to protect matter from harmful environmental influences arises in many areas of technology. One general solution to the problem comprises surrounding the substrate with an appropriate encapsulant.

For instance, when the matter to be protected comprises a joint or splice between electrical cables, such as multiconductor communications cables of the type ued in telephone systems, a prior art technique comprises providing an enclosure around the splice work, securing the enclosure to each cable entering the enclosure, and filling the enclosure with an insulating liquid curable encapsulant.

For example, U.S. Pat. No. 4,466,843 discloses a plastic liner that is placed around the splice work and secured to the cables, thereby forming an enclosure into which liquid encapsulant is poured under gravity. The encapsulant in the enclosure is then pressurized to some degree by wrapping ties, tape or the like, around the enclosure. In such a system, any encapsulant volume change subsequent to the wrapping can be expected to lead to a change in pressure. For instance, flow of encapsulant into voids within the splice work, or into the cables, decreases the effective volume of encapsulant within the enclosure, and results in a loss of pressure. Furthermore, in such a system, the splice work typically is compacted by the pressurizing means.

A new approach is disclosed by U.S. patent application Ser. No. 619,266 ('266), filed June 11, 1984 by F. J. Mullin et al (Mullin), co-assigned with this, and incorporated herein by reference. Mullin teaches forming an enclosure around the quantity of matter that is to be protected, filling the enclosure with a gelable (curable) liquid (the encapsulant), pressurizing the liquid, and providing means for maintaining pressure on the liquid at least until the liquid has solidified. In a preferred embodiment, an inner enclosure is formed around the splice by means of an elastomeric sheet, a rigid shell placed around the inner enclosure, and liquid encapsulant pumped into the inner enclosure until a predetermined pressure above ambient pressure is reached, with the elastomeric inner bag restrained by the rigid shell. Pressurization of the liquid encapsulant results, inter alia, in thorough penetration of the encapsulant into the splice work and in more complete expulsion of air from the enclosure. Enclosures of the Mullin type (referred to as the 2200 Series Closure System) are commercially available from AT&T Technologies, Inc.

A Mullin-type splice enclosure typically is better able to protect the splice from water damage than are other prior art enclosures. In particular, Mullin-type enclosures can withstand a substantially greater water head than can other prior art enclosures. However, we have found that the ability of Mullin-type splice enclosures to prevent water ingress at least in some instances decreases with time. In view of the importance of reliably excluding water from sensitive objects e.g., cable splices and optical fiber connectors, for long periods of time, an encapsulation system whose ability to withstand water ingress does not substantially decrease with time, and which is able to retain this ability under varying ambient conditions, would be of considerable interest. This application discloses such an encapsulation system.

GLOSSARY OF TERMS

A "cable" herein is an article comprising a multiplicity of elongatCed bodies, typically metallic bodies (conductors) but including also dielectric bodies of the type used as optical fibers, and further comprising a dielectric sheath surrounding the elongated bodies. It is to be understood that cables typically also comprise other constituents, such as coatings or insulation around the individual fibers or conductors, strength members, metallic shielding, and filling material. Examples of cables according to the definition are multiconductor communications cables, e.g., telephone cables, and so-called distribution wire and service wire used in telephone systems. Further examples are coaxial cables of the type used in CATV systems, power cables, including cable containing power distribution wire or service wire, and optical fiber transmission or distribution cable. Cable containing service wire typically is used to connect a customer to a distribution system, and cable containing distribution wire is typically used to branch a higher-capacity cable. Cable according to the definition can be adapted to be below ground by direct burial or in buried conduit, or to be maintained above ground.

By "solidifying", "gelling", or "curing" of the encapsulant is meant herein any process that results in a substantial increase of the room temperature viscosity of the encapsulant, typically to about $10^5$ cps (from an initial viscosity of the order of $10^2$ cps). Typical viscosity increasing processes are gellation and cross linkage.

The "ambient" pressure is about 1 bar.

SUMMARY OF THE INVENTION

We have discovered that the ability of pressurized encapsulation systems to prevent water ingress can be maintained at a high level for substantial periods of time if means for maintaining pressure on the encapsulant are provided. Such pressure-maintaining means typically comprise one or more energy storage means which provide the energy needed to maintain the pressure on the encapsulant above some predetermined value $p_2 > p_o$, where $p_o$ is the ambient pressure. Typically, $p_2 < p_1$, where $p_1$ is the initial pressure on the encapsulant. Exemplarily, $p_2$ is between 5 and 15 lb/in$^2$.

The energy storage means can take any appropriate form, provided that the storage means can compensate for the effects that, absent pressure-maintaining means, cause changes in the pressure on the encapsulant. Among these effects are relaxation of a "rigid" closure, or shrinkage of the encapsulant away from the rigid closure due to differential thermal contraction.

Exemplary energy storage means are spring clamps that urge the two halves of an outer shell against the encapsulant enclosed therein, or one or more reservoirs of pressurized gas, with the pressurized gas acting on the outer surface, or possibly on internal surfaces, of the solidified encapsulant. Other possible embodiments of the energy-storing means comprise an extendable enclosure containing mechanical energy storing means (e.g., a spring) that act against the extendable enclosure, such that a pressure drop in the medium surrounding the extendable enclosure results in an extension of the enclosure, thereby at least partially restoring the pressure in the surrounding medium. All of the embodiments of the invention have in common that the encapsulant is contained within a non-rigid first member which is enclosed by a substantially rigid second member that is adapted for restraining expansion of the first member. Curable liquid encapsulant is introduced into the space defined by the first member and is pressurized to a pressure $p_1 > p_o$ (the ambient pressure) in such a manner that the first member is extended substantially to the maximum extent permitted by the second member.

In a preferred embodiment, pressure-maintaining C-clamps according to the invention are used in conjunction with a Mullin-type pressurized cable splice protection system, in particular, with an enclosure substantially like those of the previously referred to 2200 Series Closure System. In a further preferred embodiment the energy storage means comprise an elastic body (typically a spring) that is placed between the first member and the second member and that preferably is shaped so as to exert force over both a substantial fraction of the surface of the first member and over a substantial fraction of the interior surface of the second member.

Although the invention is advantageously used for enclosing a cable splice or joint, it has other applications as well. For instance, it can be used to enclose a damaged cable region, to enclose a cable end or termination, or to form a pressure block. The invention can be used with a variety of cable types, including air core and filled cable.

DETAILED DESCRIPTION

Figure 1:
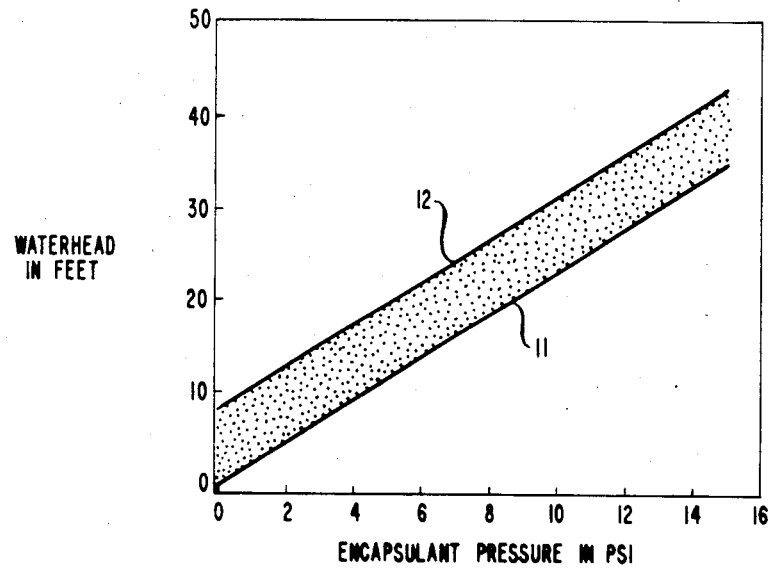
FIG. 1 shows a plot of pressure on the splice encapsulant vs. the water head that causes splice failure in a standardized test.

As discussed above, it has been found that in at least some cases the ability of the prior art forced encapsulation enclosure system to prevent water ingress diminishes with time. We have found a correlation between the pressure on the cured encapsulant and the water head that can be tolerated by an encapsulated test splice in a standardized water penetration test. This correlation is exemplified by FIG. 1, in which the region between lines 11 and 12 contains the values observed in a particular test series. Based, inter alia, on the observed correlation, we have concluded that the long term ability of forced encapsulation systems to exclude water can be significantly improved if energy-storage means are provided, with the energy-storage means adapted for maintaining the pressure on the encapsulant above a predetermined value $p_2$, with $p_o < p_2 < p_1$, for an extended period of time (e.g., the design life of a cable system, exemplarily at least 10 and even as long as 20 or 30 years) for all temperatures within the design temperature range (e.g., over a range of about 40° F.).

The invention will now be further described in terms of currently preferred embodiments. All the exemplary embodiments are based on forced encapsulation systems such as were disclosed in the '266 patent application. When installed, such systems comprise an inner (elastic) enclosures around the cable ends and the splice work, and an outer (nominally rigid) enclosure surrounding the inner one. Liquid encapsulant, e.g., an encapsulant available from AT&T Technologies, Inc. under the trade designation D-1000, is introduced into the inner enclosure, pressurized, and permitted to cure under pressure. Due to the pressurization of the encapsulant the flexible inner enclosure is extended to the extent permitted by the presence of the rigid outer enclosure.

Figure 2:
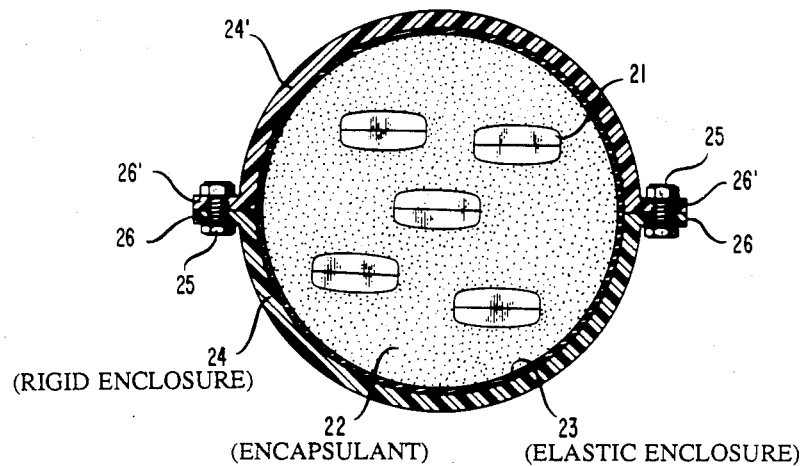
FIGS. 2 and 3 are schematic cross sectional views of an exemplary prior art Mullin-type splice system, and of a system according to the invention, respectively.

A schematic cross-sectional view of a prior art forced encapsulation splice enclosure system is shown in FIG. 2, wherein a multiplicity of connectors 21 are embedded in cured encapsulant 22, which is contained within elastomeric bladder 23, which in turn is contained within a rigid enclosure consisting of segments 24 and 24'. It will be appreciated that the connectors 21 are intended to symbolize all of the splice work, and that features such as a splice organizer, bond bar, pour and/or pump spout, optional pressure indicator, and the like are not shown. The two segments of the outer enclosure are fixedly and contactingly held together by nuts and bolts 25. The prior art also knows other means for keeping the two segments of the enclosure pressed together, e.g., C-clamps placed over lips 26 and 26'.

Figure 3:
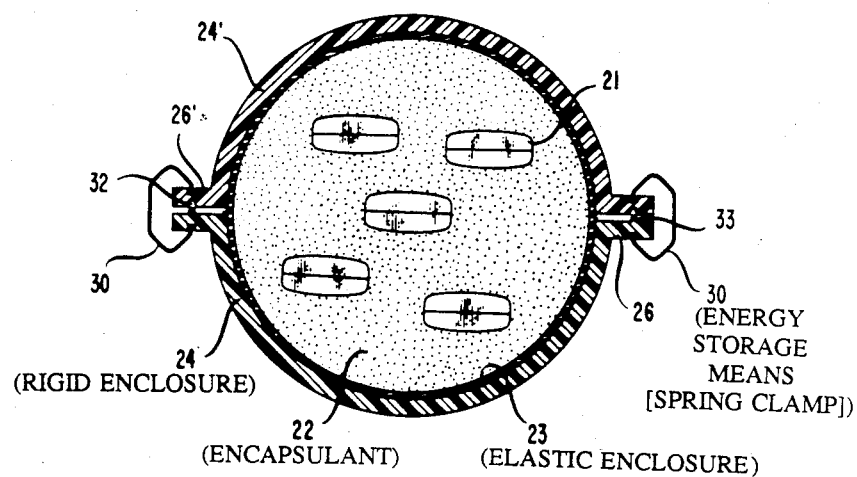

A splice enclosure system according to the invention is schematically depicted in FIG. 3. The two segments 24 and 24' are maintained such that a gap exists between lips 26 and 26', and means 30 permit changes in the gap size while maintaining pressure on encapsulant 22. Means 30 typically are appropriately shaped and dimensioned spring clamps, exemplarily fabricated from non-corroding material such as type 304 stainless steel. The size of the gap between lips 26 and 26' can be expected to vary with temperature, due to differences in thermal expansion between the shell material and the encapsulant. The gap size can also be expected to decrease monotonically with time, due to relaxation of the shell material. The initial gap size thus as to be chosen such that these changes can be accommodated. The dimensions of the spring clamp as well as its spring constant must be selected such that the chosen initial pressure, allowable pressure drop, short term dimensional changes in the closure system due to differential thermal contraction, and long term dimensional changes due to relaxation and creep can be accommodated, as will be appreciated by those skilled in the art. The selection can be made using well-known engineering techniques.

For instance, in an exemplary inventive splice system of the Mullin type that resembles the previously referred to 2200 Series closure (urethane-based encapsulant, 4 inch internal diameter polypropylene shell, initial pressure $p_1 = 15$ psi) two spring clamps, formed from 0.125 inch thick 304 steel and extending the full length of the shell, having a "C" cross section, with 0.340 inch radius of the top and bottom curved sections of the C, and 1.136 inch length of the straight center part of the C, result in an initial gap of 0.076 inch, and maintain a pressure on the encapsulant of at least 5 psi over the design life of 30 years, if the maximum temperature drop does not exceed 40° F.

Figure 4:
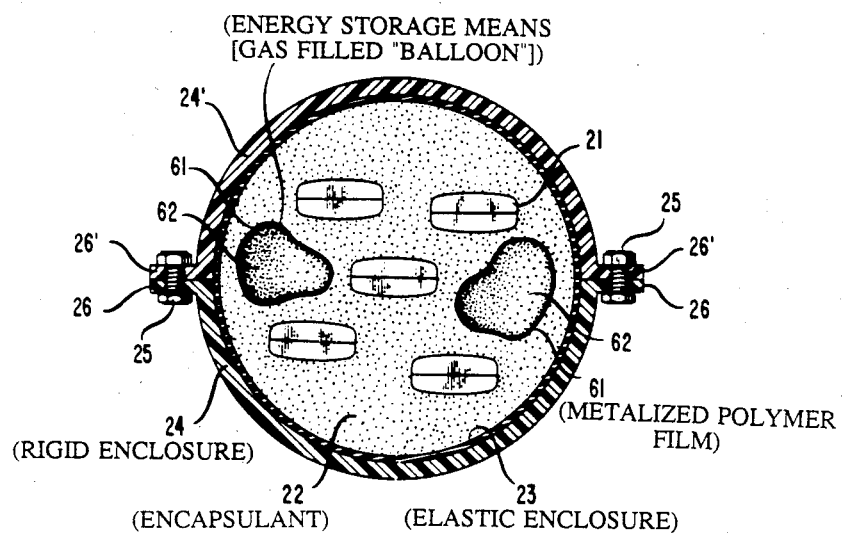
FIGS. 4, 5, 6 and 7 schematically depict further exemplary embodiments of the invention.

A further exemplary embodiment of the invention is schematically depicted in FIG. 4. The embodiment resembles the prior art closure system of FIG. 2, except that the inventive system contains one or more gas-filled "balloons" 62 which serve as energy storing compliant members. The balloons are filled, prior to pressurization of the liquid encapsulant, with any appropriate gas, e.g., air or $N_2$, and the gas therein will be compressed during pressurization of the encapsulant. Since the gelled encapsulant transmits, over distances, and in times, relevant herein, pressure substantially like a liquid, the entire mass of encapsulant is under essentially the same pressure. It will be appreciated that membrane 61 of the balloons should be substantially impermeable to the gas contained therein. An exemplary membrane material is metallized plastic film, e.g., aluminized MYLAR plastic film.

For instance, in an exemplary inventive splice system that also resembles the previously referred to 2200 Series closure (urethane-based encapsulant, 4 inch internal diameter polyproylene shell of 21 inches length, $p_1=15$ psi), a uniformly distributed air bubble located between the encapsulant and the shell maintains a pressure on the encapsulant of at least 5 psi over 30 years (maximum temperature drop 40° F.) if the bubble envelope has zero permeation rate, the bubble volume at ambient pressure is 26.4 inches$^3$, and the bubble has an area of about 264 inches$^2$ and a thickness of 0.100 inches. If the permeation rate is not zero the bubble volume is to be increased accordingly, as will be apparent to those skilled in the art.

Figure 5:
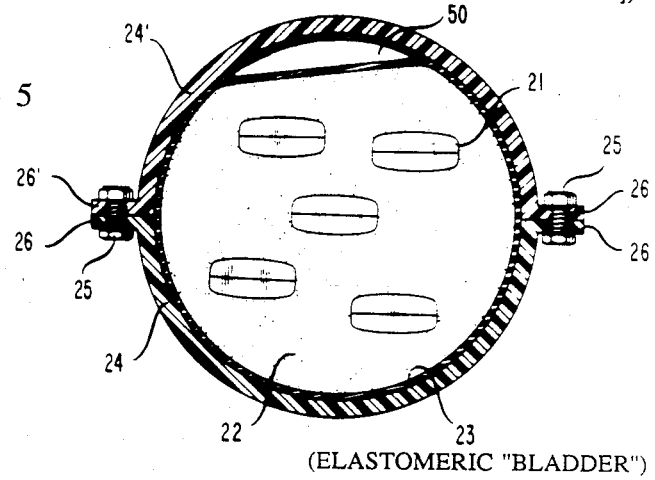
Figure 7:
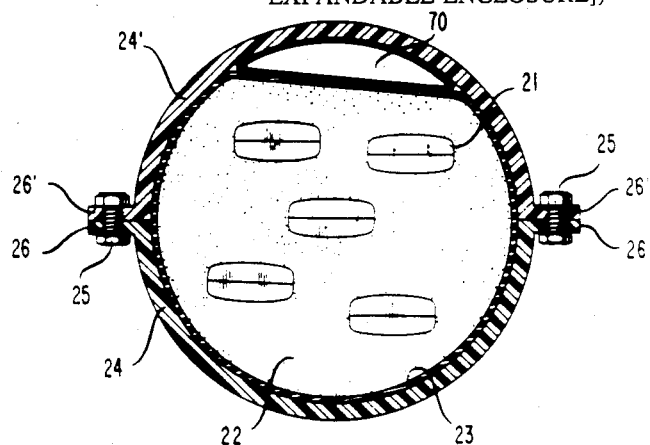

Energy storage using pressurized gas can also be practiced in other ways. For instance, a splice can be encapsulated, the encapsulated splice enclosed in a gas tight rigid enclosure, gas introduced into the enclosure until the desired pressure is reached, and the enclosure sealed. In a variation of this concept, the pressurizing gas is generated by chemical means within the gas tight enclosure. In a further variation, the gas is contained in a separate extensible enclosure that is located between the encapsulant and the rigid enclosure. For instance, an expandable enclosure can be placed between the nonrigid first member of the containment means (e.g., the encapsulant-receiving elastomeric bag) and the rigid enclosure, or the encapsulant-receiving elastomeric bag can be completely or partially double walled, with the volume of the thus formed compartment filled with gas. Such a splice enclosure is schematically depicted in FIG. 5, wherein the partially double walled elastomeric bag 23 forms gas-filled compartment 50. A further exemplary embodiment of this type is depicted schematically in FIG. 7, wherein gas-filled expandable enclosure 70 is located between the rigid enclosure 24' and the nonrigid enclosure 23.

Figure 6:
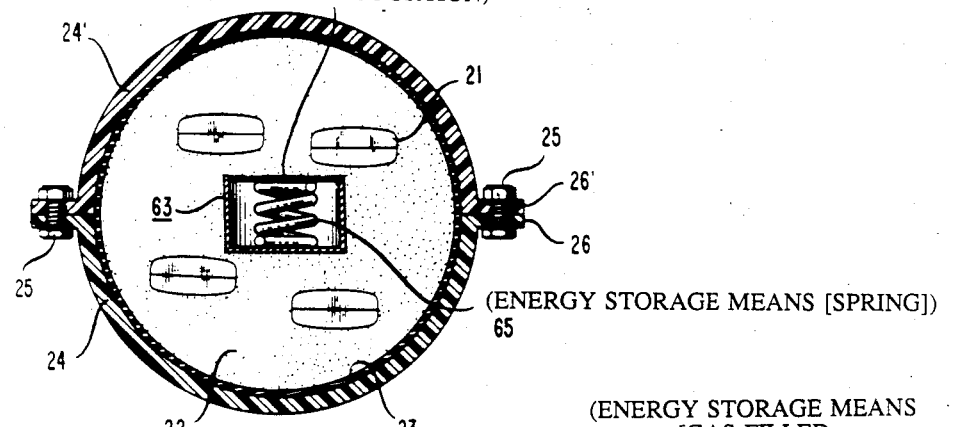

Furthermore, mechanical energy storage means can be used instead of pressurized gas. For instance, a spring contained within an enclosure embedded in the encapsulant and acting against an extensible portion of the enclosure can be used instead of the above described embedded gas-containing "balloon". Such a splice enclosure is schematically depicted in FIG. 6, wherein enclosure 63 is embedded within encapsulant 22, with 63 comprising extensible portion 64, and spring 65 acting against 64.

Figure 8:
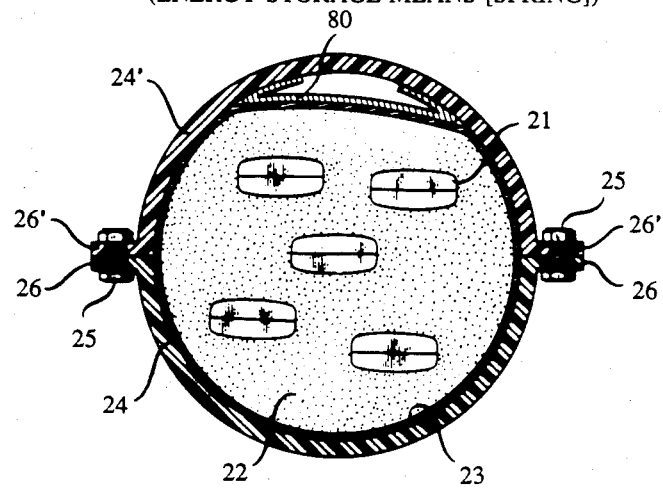
FIG. 8 schematically depicts a still further exemplary embodiment of the invention.
Figure 9:
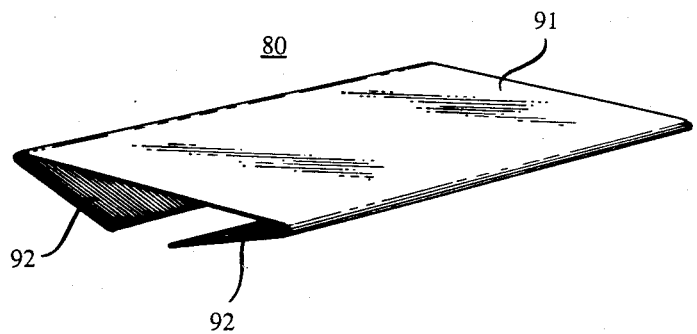
FIG. 9 shows schematically an elastic body of the type used in the embodiment of FIG. 8.

The above examples are intended to be illustrative of the invention and by no means exhaust the possible embodiments of the invention. For instance, a further embodiment of the invention is schematically shown in FIGS. 8 and 9, in which 80 is a spring placed longitudinally between the elastomeric bladder 23 and the rigid shell (24 and 24'). The undeformed spring 80 is shown in end view in FIG. 9, whereas in FIG. 8 the spring is shown in its deformed state. Typically the length of 80 is close to (but less than) the length of the rigid shell, and the width of the median section 91 of 80 is advantageously at least 50% of the internal diameter of the rigid shell. In the undeformed state the terminal segments 92 are at an angle less than 90° (e.g., about 30°) with respect to 91. Exemplarily, 80 is made of 0.025 inch thick 304 stainless steel sheet.

What is claimed is:

1. A method of enclosing a quantity of matter comprising at least a part of at least one cable, the method comprising
    (a) forming an enclosure around the quantity of matter by a process that comprises fastening a nonrigid first member to the at least one cable and enclosing the quantity of matter with the first member, leaving a void or voids between the first member and the quantity of matter, and further comprises enclosing the first member with a substantially rigid second member that is adapted for restraining expansion of the first member;
    (b) introducing into the enclosure a curable liquid encapsulant;
    (c) pressurizing the curable liquid encapsulant to a pressure $p_1$ that is substantially greater than an ambient pressure $p_o$, and such that the first member is extended substantially to the maximum extent permitted by the second member;
    (d) permitting the pressurized curable liquid encapsulant to cure, the cured liquid encapsulant to be referred to as "the encapsulant";
    characterized in that the method further comprises
    (e) providing energy storage means adapted for maintaining, for a relatively long period of time and for all temperatures within a predetermined temperature range, a pressure on the encapsulant that is greater than a predetermined pressure $p_2$, with $p_o < p_2 < p_1$.

2. The method of claim 1, wherein the quantity of matter comprises a splice between at least two cables, and wherein forming the enclosure comprises fastening the nonrigid first member to the two cables such that the first member surrounds the splice.

3. The method of claim 2, wherein the second member comprises a first and a second segment, the segments adapted for being joined together so as to substantially surround the first member, and the method comprises joining together the two segments such that, at least when the pressure on the encapsulant is above $p_2$, a gap exists between the first and second segment, with the energy storage means adapted for urging the second segment towards the first segment.

4. The method of claim 3, wherein the first and second segments each have a substantially arcuate cross section, the method comprises joining together the first and second segments so as to form a substantially tubular second member, and wherein the energy storage means comprises spring means.

5. The method of claim 4, wherein the spring means comprises a spring clamp of substantially C-shaped cross section, wherein each segment comprises means adapted for engaging the spring clamp, and wherein the method comprises engaging the spring clamp with the segments.

6. The method of claim 1, comprising placing the energy storage means within the substantially rigid second member.

7. The method of claim 6, comprising placing the energy storage means between the first member and the second member, with the energy storage means comprising an expandable enclosure containing an energy storage medium, the energy storage medium exerting an outward force on at least a portion of the expandable enclosure.

8. The method of claim 6, comprising placing the energy storage means within the first member, with the energy storage means comprising an expandable enclosure.

9. The method of claim 7 comprising placing a gas-filled expandable enclosure between the first and the second member, the gas being the energy storage medium.

10. The method of claim 8 comprising placing a spring-containing expandable enclosure within the first member, the spring being the energy storage medium.

11. The method of claim 9 comprising providing an expandable enclosure that comprises metallized polymer film.

12. The method of claim 6, wherein the first member comprises a compartment adapted for receiving and retaining therein a quantity of gas, the method comprising introducing the quantity of gas into the compartment.

13. The method of claim 6, comprising placing the energy storage means between the first member and the second member, with the energy storage means comprising a spring.

14. The method of claim 13, wherein the spring has a median portion and two terminal portions connected to the median portion and forming an angle less than 90' therewith, the method comprising placing the spring substantially longitudinally between the first and the second member.

15. An assembly comprising
(a) a quantity of matter comprising at least a part of at least one cable;
(b) an encapsulant contactingly surrounding the quantity of matter, the encapsulant formed by curing of a liquid curable encapsulant;
(c) an enclosure surrounding the encapsulant, the enclosure comprising a nonrigid first member that is fastened to the at least one cable and encloses the quantity of matter, and further comprising a substantially rigid second member that encloses the first member and is adapted for restraining expansion of the first member;
(d) means for introducing the liquid curable encapsulant into the enclosure; and
(e) means for presurizing the liquid curable encapsulant to a pressure $p_1$ that is substantially greater than an ambient pressure $p_o$, such that the first member is extended substantially to the maximum extent permitted by the second member;

characterized in that the assembly further comprises
(f) energy storage means adapted for maintaining, for a relatively long period of time and for all temperatures within a predetermined temperature range, a pressure on the encapsulant that is greater than a predetermined pressure $p_2$, with $p_o < p_2 < p_1$.

16. The assembly of claim 15, wherein the period of time is at least 10 years and the temperature range is at least about 40° F.

* * * * *